(12) United States Patent
Talon

(10) Patent No.: US 9,821,950 B2
(45) Date of Patent: Nov. 21, 2017

(54) FOOD OR BEVERAGE CAPSULE WITH BUILT-IN FOAMING CAPABILITIES

(71) Applicant: NESTEC S.A., Vevey (CH)

(72) Inventor: Christian Talon, Vufflens-le-Chateau (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/910,457

(22) PCT Filed: Jul. 18, 2014

(86) PCT No.: PCT/EP2014/065528
§ 371 (c)(1),
(2) Date: Feb. 5, 2016

(87) PCT Pub. No.: WO2015/018628
PCT Pub. Date: Feb. 12, 2015

(65) Prior Publication Data
US 2016/0176624 A1  Jun. 23, 2016

(30) Foreign Application Priority Data
Aug. 7, 2013  (EP) .................................... 13179603

(51) Int. Cl.
*B65D 85/804* (2006.01)
*B65D 85/73* (2006.01)
*A47J 43/12* (2006.01)

(52) U.S. Cl.
CPC ......... *B65D 85/8043* (2013.01); *B65D 85/73* (2013.01); *A47J 43/127* (2013.01)

(58) Field of Classification Search
CPC ..... B65D 85/8043; B65D 85/73; A47J 43/127
See application file for complete search history.

(56) References Cited

U.S. PATENT DOCUMENTS

2009/0317518 A1  12/2009  York et al.
2010/0034929 A1  2/2010  Dogan et al.

FOREIGN PATENT DOCUMENTS

| EP | 0638486 B1 * | 10/1996 | ............ A47J 43/12 |
|----|----|----|----|
| EP | 1440908 | 7/2004 | |
| EP | 1500358 | 1/2005 | |
| EP | 1580143 | 9/2005 | |

* cited by examiner

*Primary Examiner* — Erik Kashnikow
*Assistant Examiner* — Lela S. Williams
(74) *Attorney, Agent, or Firm* — K&L Gates LLP

(57) ABSTRACT

The present invention is directed to a container (C) for the preparation of flowable food or beverage compositions, adapted to be functionally inserted in a food or beverage preparation machine (M), said container comprising walls defining at least one cavity (27) for containing at least one precursor ingredient, and a dispensing channel (15) through which the food or beverage composition can flow to a consumer receptacle, characterized in that it further comprises a foaming whisk element (29) located at least partially into the dispensing channel (15) so as to be able to whip said product when the latter exits said channel (15).

8 Claims, 7 Drawing Sheets

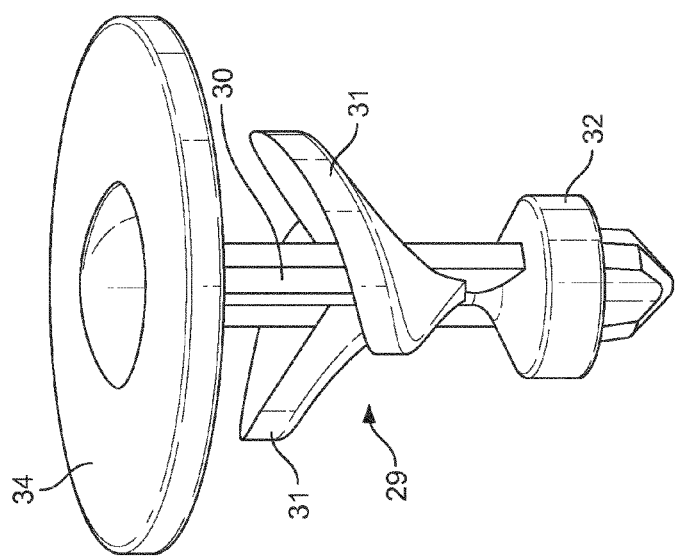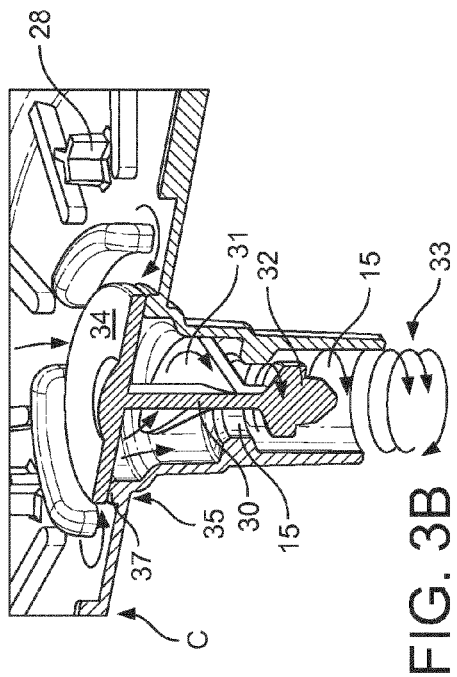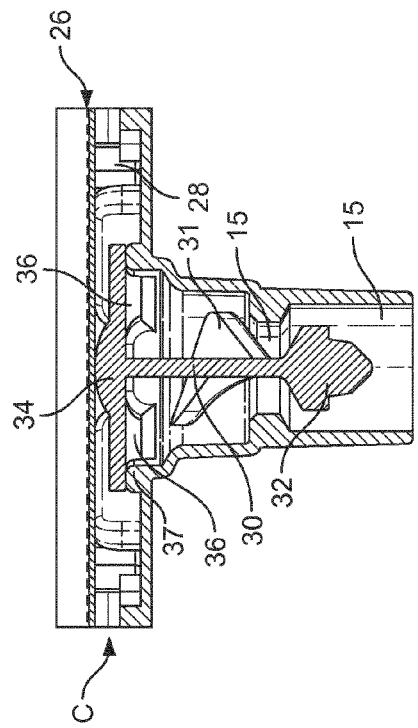

FOOD OR BEVERAGE CAPSULE WITH BUILT-IN FOAMING CAPABILITIES

CROSS REFERENCE TO RELATED APPLICATIONS

The present application is a National Stage of International Application No. PCT/EP2014/065528, filed on Jul. 18, 2014, which claims priority to European Patent Application No. 13179603.9, filed Aug. 7, 2013, the entire contents of which are being incorporated herein by reference.

FIELD OF THE INVENTION

The present invention concerns a capsule for use in a machine for the preparation of food or beverage products which comprise at least one foamed portion.

BACKGROUND OF THE INVENTION

In the following description, it will be described that the invention is a capsule for use in the preparation of liquid foods, particularly beverages. However, it should remain clear that the invention also encompasses other types of flowable edible compositions, such as semi-liquid food like soups, gels, creams, soft ice cream and so on.

Generally, beverage preparation machines are well known in the food industry and consumer goods domain. Such machines allow a consumer to prepare on command a single serving of a beverage such as brewed coffee, espresso coffee, tea, hot chocolate drink, or the like.

Most beverage preparation machines for in-home use operate according to a system in which beverage ingredients are provided as individually-packaged, single-serving portions. Such portions can be soft pods, pads, or sachets, but increasingly more systems use semi-rigid or rigid portions such as rigid pods or capsules. In the following, it should be understood that the beverage machine in question is a beverage preparation machine working with a rigid or semi-rigid capsule.

In many instances, the capsules for use in beverage preparation machines are sealed. Such sealed capsules are advantageous in that they protect the ingredient contained therein from the surrounding atmosphere, improving the shelf life of the capsule. Typically, such closed capsules are made from a gas and/or moisture impermeable material, and feature a rigid or semi-rigid body having one of its walls made from a flexible membrane.

The beverage is prepared by inserting the capsule into a beverage machine, which preferably comprises a receptacle for accommodating said capsule and a fluid injection system for injecting a fluid (preferably water) under pressure into said capsule. In most applications, the water injected into the capsule under pressure is heated, generally to a temperature above 70° C. However, in some particular instances it may be advantageous to inject ambient or chilled water instead. The pressure inside the capsule chamber during extraction and/or dissolution of the capsule contents is typically about 1 to about 8 bar for dissolution products and about 2 to about 12 bar for extraction of roast and ground coffee.

The present invention could also encompass the so-called "brewing" process of beverage preparation—particularly for tea and coffee. Brewing involves the infusion over time of the ingredient in a fluid, most commonly hot water, whereas extraction or dissolution preparations produce a beverage within a few seconds.

For purposes of clarity, however, in this document the term "brewing" of an ingredient by a fluid is understood to encompass extraction of a powdered edible material (e.g. roast and ground powdered coffee), dissolution of edible soluble material (e.g. soluble tea, coffee, milk, or cocoa), or the infusion of an edible material in an infusion fluid under very low or atmospheric pressure, for a longer time than that required for extraction or dissolution (e.g. tea leaves in hot water).

The principle of extracting and/or dissolving the contents of a closed capsule under pressure is known and consists typically of confining the capsule in a receptacle of a machine, injecting a quantity of pressurized water into the capsule to extract or dissolve the substance, and then dispensing the resulting beverage from the capsule.

The injection is generally performed by piercing a face of the capsule with a piercing injection element, such as a fluid injection needle incorporated into the machine. Capsules applying this principle have already been described, for example in applicant's European patent no° EP 1 472 156 B1, and in EP 1 784 344 B1.

In addition, machines applying this principle have already been described for example in patents CH 605 293 and EP 242 556. According to these documents, the machine comprises a receptacle for the capsule, and a perforation and injection element made in the form of a hollow needle comprising in its distal region one or more liquid injection orifices. The needle has a dual function in that it simultaneously opens the top portion of the capsule while providing an inlet channel into the capsule for the injection of the water.

The machine comprises a supply of the fluid (usually water) that is used to prepare the beverage from the ingredient(s) contained in the capsule. The machine further comprises a heating unit such as a boiler or a heat exchanger, which heats the water used therein to working temperatures (usually between 80° and 90° C.). Finally, the machine comprises a pump for circulating the water from the tank to the capsule, optionally though the heating unit. The circulation of the water within the machine may be directed via a selecting valve means, such as for instance a peristaltic valve of the type described in applicant's European patent application EP 2162653 A1.

Such systems are particularly well-adapted to the preparation of coffee. One configuration for achieving this which is particularly advantageous is to provide a capsule containing roast and ground coffee powder, which is extracted with hot water injected therein.

Capsules have been developed for such an application, which are described and claimed in applicant's European patent EP 1 784 344 B1, or in European patent application EP 2 062 831.

In short, such capsules typically comprise:

- a hollow body and an injection wall which are impermeable to liquids and to air, the wall being attached to the body and adapted to be punctured by e.g. an injection needle of the machine;
- a chamber containing a bed of roast and ground coffee to be extracted;
- an aluminium membrane disposed at the bottom end of the chamber for retaining the internal pressure therein, the membrane being associated with piercing means which create drainage holes in the aluminium membrane when the internal pressure inside the chamber reaches a certain pre-determined value; and
- optionally, a deflection means configured to break up the jet of fluid, thereby reducing the speed of the jet of fluid injected into the capsule and evenly distributing the fluid across the bed of substance at a reduced speed.

During extraction, the beverage capsule is pierced by the fluid injection needle of the beverage preparation machine. The liquid is injected in the capsule compartment and the pressure within the capsule increases, facilitating the extraction of the beverage from the ingredients contained within the capsule.

Once prepared within the capsule, the product is dispensed to the consumer's cup or similar receptacle through a dispensing channel or dispensing opening.

Many flowable products prepared with a capsule as described above are available, many of which are supposed to contain a foamed portion. Foam gives a creamy and light mouthfeel, and boosts the organoleptic experience of the consumer, as it creates an interface between the liquid and the gaseous phases of the product. Foam is therefore an important component for some products.

A foam phase is generally created by the tight mixing of a gaseous phase into a liquid phase. Concerning flowable foods and beverages, foam is generally created by mixing air with the liquid product. The finer the bubbles, the stronger and creamier the foam. Some ingredients can also be added to the composition to enhance and/or stabilize the foam. For instance proteins are known to provide a better foaming quality. In all cases though, the minimal requirement for the creation of foam is the presence of air mixed in the liquid phase.

Unfortunately though, it was found that many systems using capsules for the easy preparation of beverages, provide poor foaming capabilities, and/or involve expensive structural design to provide such foaming capabilities.

Some known capsules comprise air vents located within the capsule compartment, or at an entry point of the capsule compartment such as described in European patent publication EP 2058243 B1. Such capsules require piercing the capsule wall with an air vent, which produces risks of leakage.

Some other capsules comprise foaming means inserted within the capsule compartment, which require a specific and somehow complex flowpath to ensure that said foaming means can operate. However, such internal devices do not allow air, or generally a gas, to be mixed with the liquid product to produce a foam.

There is therefore a need for a container, for instance a capsule, for producing flowable food or beverages, that comprises means able to produce foam, without the disadvantages of the known solutions.

SUMMARY OF THE INVENTION

The main objective set out above is met with a container for the preparation of flowable food or beverage compositions, adapted to be functionally inserted in a food or beverage preparation machine, said container comprising walls defining at least one cavity for containing at least one precursor ingredient, and a dispensing channel through which the food or beverage composition can flow to a consumer receptacle, characterized in that it further comprises a foaming whisk element comprising a longitudinal rod and at least one blade (preferably it comprises a plurality of blades), located at least partially into the dispensing channel so as to be able to whip said product with ambient gas when the latter exits said channel.

When the product prepared within the container exits the container through the dispensing channel, it flows along the blade of the whisk element. The said blade acts as a cutter for the flow of said liquid product. The cutting effect produces a spinning and shearing effect onto the flow of liquid product that exits the container, at a sufficient high speed to suck ambient air which is present outside of the container, said air being trapped into, and mixed with the liquid phase. The resulting product is therefore a fine mixture between liquid product and fine gas bubbles, which creates a foam layer into the cup where the food or beverage composition is dispensed.

Additionally, it was found that the stability of the foam thus produced can be enhanced by the presence of specific ingredients like proteins in the product composition. Moreover, viscosity of the product is also a parameter that can favourably enhance and stabilize the foam layer that is created in the resulting product that is dispensed from the container of the invention.

The precise location of the dispensing channel relative to the rest of the container does not substantially influence the function and effect of the invention. Preferably, the dispensing channel is a vertical channel located at the bottom of the container when said container is inserted into, and in function inside the food or beverage preparation machine. However, said dispensing channel could be located at another place, like for instance on a side of the container, or in a position that is not vertical when the container is in function and when the product is dispensed therefrom.

Furthermore, the exact structure of the container according to the invention is not critical to the functioning of the dispensing channel and foaming whisk according to the invention. One example of a suitable container is a rigid capsule described in Applicant's European patent EP 1 472 156 B1. However, other types of suitable containers such as sachets containing a rigid portion with a dispensing channel are also suitable for using the invention. Such sachets are described for instance in WO 99/05044, GB 2 374 856 and WO 2012/175985 publications, and also for instance in WO 2013/019963.

The whisk according to the present invention can be either stationary, or alternatively, it can be rotary about its longitudinal axis. In the latter case, its rotation is most preferably actuated by the flow of product dispensed through the dispensing channel.

Advantageously, the whisk blade is a double curvature blade.

In one possible embodiment of the invention, the whisk comprises a plug having shapes and dimensions adapted to close the dispensing channel when said plug is located within said channel, said whisk further comprising at least one elastically deformable curved spring able to link said whisk to the container in a movable manner between:

(i) a closed position where pressure within the container cavity is below a first predetermined pressure PC, the whisk spring is at rest, and the whisk plug seals against a sealing portion of the channel walls, (ii) a dispensing position where pressure within the container cavity is equal or superior to PC, the whisk spring is elastically deformed and the whisk plug is moved away from the channel walls so that said flowable food or beverage can flow outside of said container through said channel.

The container according to the present invention can be a rigid or semi-rigid capsule. It is preferably for the preparation of coffee, tea, chocolate, or fruit based beverages, although other types of edible flowable products can be prepared out of such a container, as long as said products preparation requires a foaming or whipping step.

BRIEF DESCRIPTION OF THE DRAWINGS

Additional features and advantages of the present invention are described in, and will be apparent from, the description of the presently preferred embodiments which are set out below with reference to the drawings in which:

FIG. 3A is a perspective view of a first embodiment of a foaming whisk according to the invention;

FIG. 3B is a partial perspective cut view of the bottom part of a beverage capsule having a foaming whisk according to the invention;

FIG. 3C is a partial side cut view of the bottom part of a beverage capsule having a foaming whisk, similar to FIG. 3B;

DETAILED DESCRIPTION OF THE INVENTION

Figure 1:
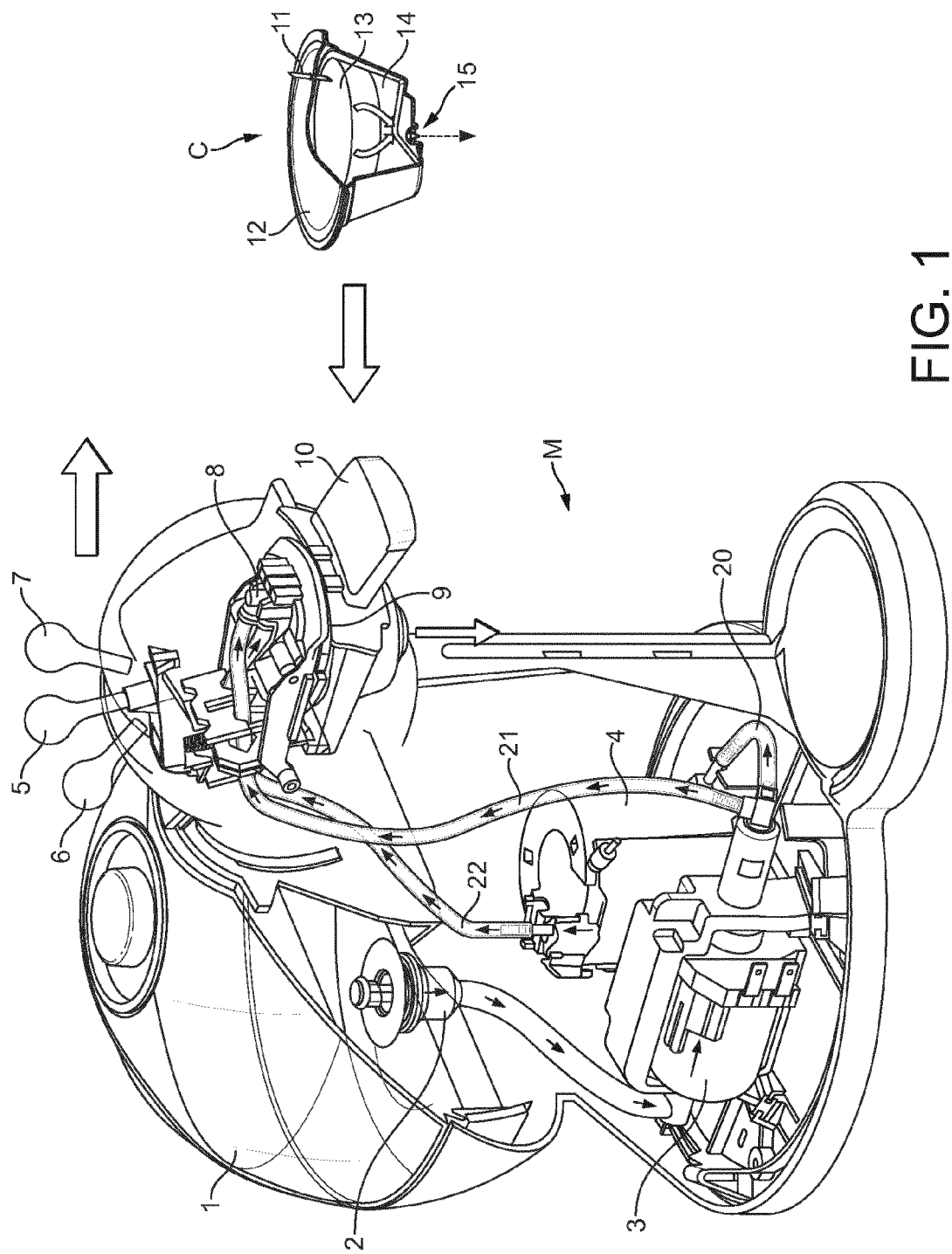
FIG. 1 is a schematic perspective cut view showing the interior of a food or beverage preparation machine.

The machine M according to the invention illustrated in FIG. 1 is a beverage preparation machine for use with a single use ingredient container, which in the following is a rigid capsule C.

The machine M comprises a water reservoir removably attached to the machine body, and fluidly connected through a fluid link pipe 2 to a fluid pump 3 that is suitable for circulating the water from the reservoir, through the machine functional elements, towards the capsule C when said capsule is functionally inserted with said machine M. The pump 3 is for instance a solenoid piston pump. However, other types of pump means could also be used.

The machine M further comprises two pipes that extend from the pump output end, each of which corresponds to an alternative route for the water flow, depending on the selection of temperature that is chosen by the user, as will described hereafter. The first fluid link pipe 20 links the pump 3 to the heating element 4, and therefore aims at conducting water expelled by said pump 3 towards the heating element 4 through which said water is heated into fluid conduits, to a temperature suitable with the preparation of hot drinks. Said heated water is then conveyed from the heating element 4 towards the injection needle 11 of the machine, through a hot water conducting pipe 22.

The alternative fluid pipe 21 extends from the pump outlet directly towards the flow route selector valve and injection needle 11 as shown in FIG. 1. In other terms, the cold water pipe 21 bypasses the heating element 4 and aims at conducting cold water expelled by the pump directly to the capsule C, via the flow route selector valve 8 and injection needle 11.

The capsule C comprises capsule walls, a top pierceable injection wall 12 which is to be pierced by the water injection needle 11 of the machine M, when said capsule is functionally inserted within the machine M. The water 13 that is injected therein, passes through a bed of ingredient 14, for instance a bed of roast and ground coffee, or mixes with a soluble ingredient (coffee or milk), to create a beverage product that is then dispensed through a dispensing channel 15 of the capsule C, as illustrated with a dotted arrow in FIG. 1.

When the capsule C is loaded within the capsule holder 10, and said capsule holder 10 is inserted functionally inside the machine, the machine can be started for the preparation of a beverage by actuation with the selector lever 5. Water 13 is then withdrawn from the reservoir 1 and circulates through the pipes and functional elements of the machine (pump, heating element, flow route selector valve, injection needle) as illustrated with arrows in FIG. 1. There are two alternative routes for the water, depending on the position of the selection lever 5 when a beverage preparation cycle is started.

In the first case, if the selector lever is positioned in its cold position 6, water will not be circulated through the heating element 4. In this case, the flow of water 13 bypasses the heating element 4 and circulates from the reservoir 1, through the pipe 2, then through the pump 3 and through the cold pipe 21 towards the flow route selector valve 8 and injection needle 11, through which it passes and is injected into the capsule C.

In the second case, if the selector lever 5 is on the hot position 7, the flow of water 13 circulates from the reservoir 1, through the pipe 2, then through the pump 3 and through the pipe 20 that links the pump 3 and the heating element 4, and the from the heating element 4 through the hot water pipe 22 towards the flow route selector valve 8 and injection needle 11, through which it passes and is injected into the capsule C.

Figure 2:
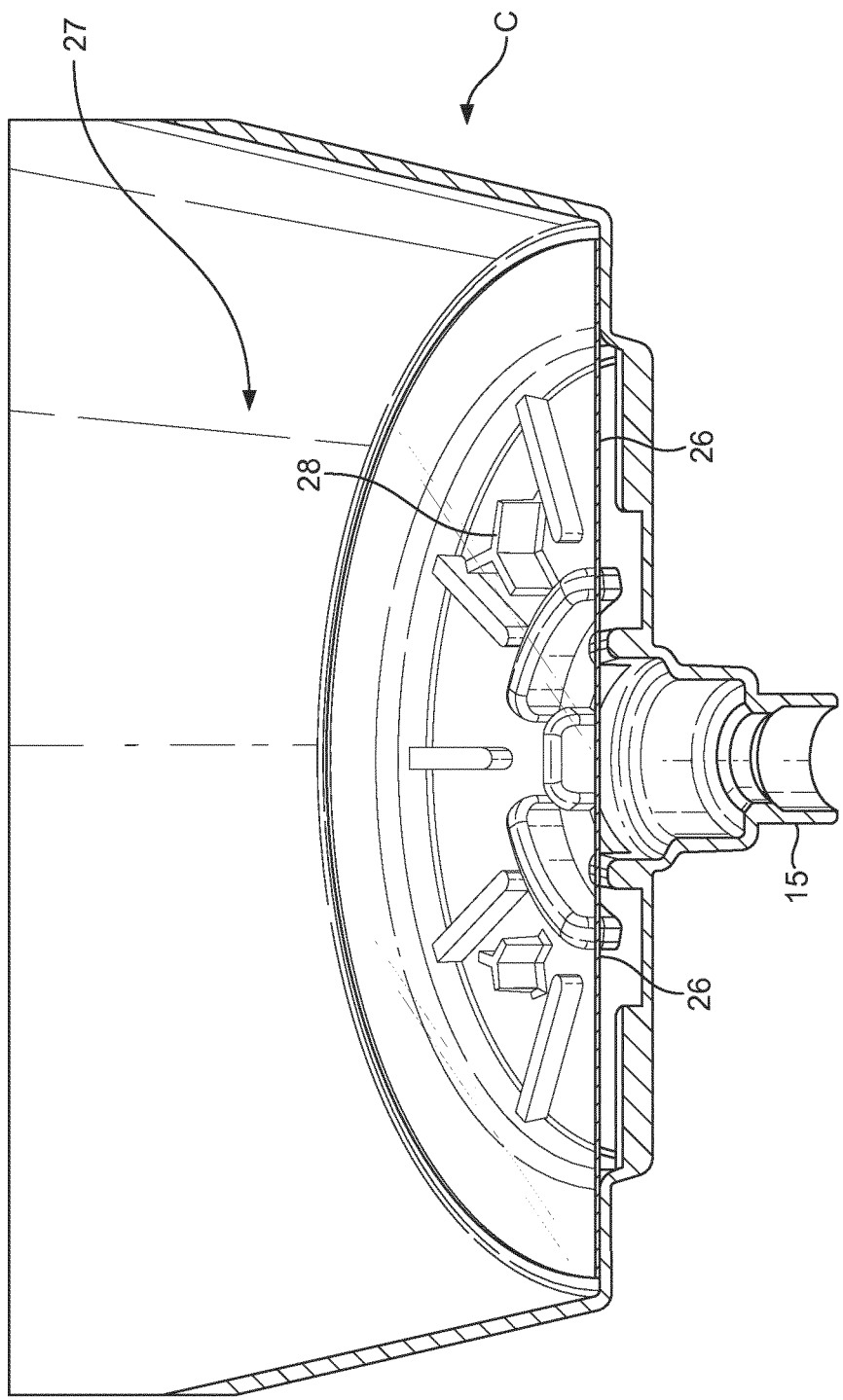
FIG. 2 is an partial perspective cut view of the bottom part of a beverage capsule.

The bottom portion of a capsule C is illustrated in greater detail in FIG. 2. The capsule C according to the present invention comprises capsule walls that define a capsule cavity, into which a beverage ingredient is contained. This ingredient is in a form suitable for being mixed with water injected inside the capsule by the machine, under pressure through a water injection needle 11 (not represented in FIG. 2 but illustrated in FIG. 1). Typically, the ingredient is a powder; however, it can also be a liquid concentrate, a gel, a compacted powder (e.g. a tablet), or a mass of discrete elements such as small ingredient masses having a diameter less than 1 mm, that are either agglomerated or compacted.

The capsule C further comprises a dispensing channel 15, and opening means that open upon effect of the rise of pressure within said cavity. The opening means comprise a pierceable wall 26 sealed between said capsule cavity 27 and said dispensing channel 15, and piercing means 28 located within the cavity or outside said cavity, and adapted to pierce said pierceable wall 26 upon effect of the rise of pressure within said cavity. Said piercing means is a plate having a surface covered with at least one piercing protrusion 28.

In a first embodiment of the invention, as illustrated in FIG. 2, said plate is integrally moulded together with the rest of the capsule. However, in another embodiment (not represented in the drawing), the plate could be an independent element that is placed between the channel 15 and the pierceable wall 26, with the piercing protrusions oriented towards the pierceable wall.

According to the invention, the capsule further comprises a foaming whisk element 29 located at least partially into the dispensing channel so as to be able to whip said product with ambient gas when the latter exits said channel. The whisk is an elongated element having a longitudinal axis that is generally parallel to the longitudinal axis of the dispensing channel 15.

A first embodiment of the whisk 29 is illustrated in FIG. 3A. As shown, the whisk comprises a longitudinal rod 30 and a pair of double curvature blades 31.

The foaming whisk 29 further comprises a plug 32 that is located at the lowermost distal end of the rod 30, as illustrated in FIG. 3A. One function of the plug 32 is to deviate the flow of liquid flowing through the channel illustrated with arrows in FIG. 3B, and create a tube-like flow 33 by pressing the liquid in the space between the internal surface of the channel 15 and the external surface of said plug 32. Moreover, said flow of liquid has a rotating movement due to its earlier passage onto the foaming blades 31. As a result of the combined rotation and tube-like shape, the liquid product exits the dispensing channel 15 as a cyclonic fluid column that is able to suck and absorb air, which is mixed with said liquid at a high velocity, hence creating a strong foaming effect.

The foaming whisk 29 also comprises a plate-shaped top 34 that allows said foaming whisk to be assembled with the capsule. More specifically, the plate-shaped top rests onto a crenelated edge 35 of the capsule that surrounds the uppermost part of the dispensing channel, as illustrated in FIGS. 3A and 3B. When said plate-shape top 34 is positioned onto the edge 35, fluid communication holes 36 are maintained in between the crenels 37, as shown in FIG. 3B, which allow the flowable product prepared in the capsule to flow from the capsule cavity 27 into the dispensing channel 15 and out of said capsule.

Figure 4B:
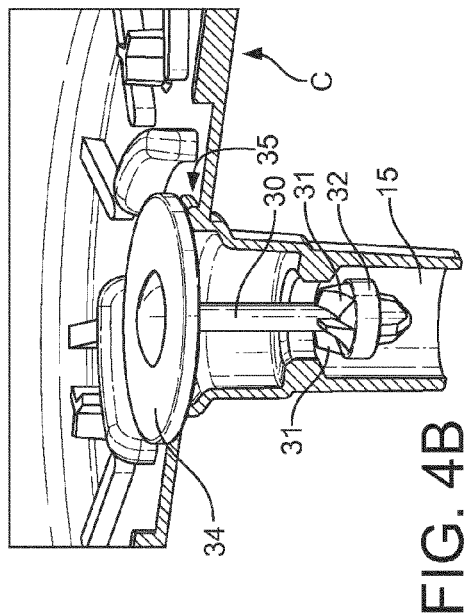
FIGS. 4A, 4B, 4C are views of a second embodiment of a foaming whisk, similar to respectively FIGS. 3A, 3B and 3C.
Figure 4C:
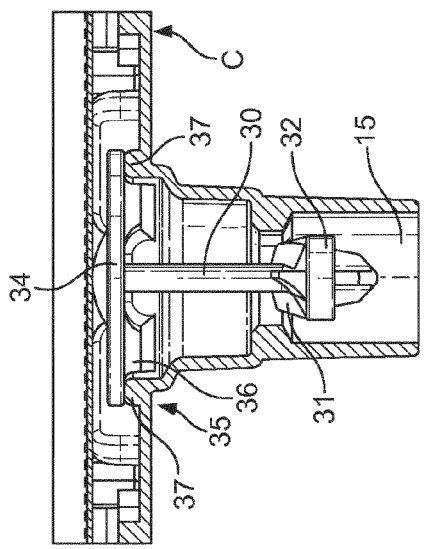
Figure 4A:
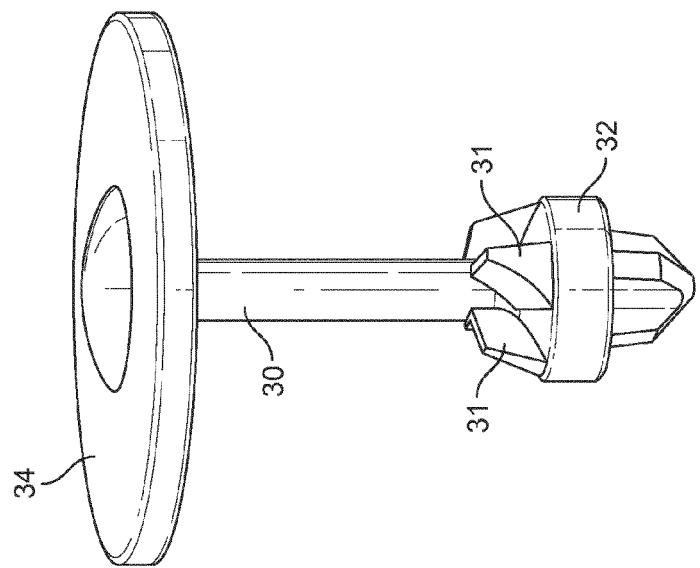

In a second embodiment of the invention illustrated in FIGS. 4A, 4B, and 4C, the foaming blades 31 are shorter than in the previous embodiment mentioned above, and they are attached to the upper surface of the plug 32. Such blades can be single-curvature blades, or they can be double-curvature blades as shown in FIG. 4B.

Figure 5C:
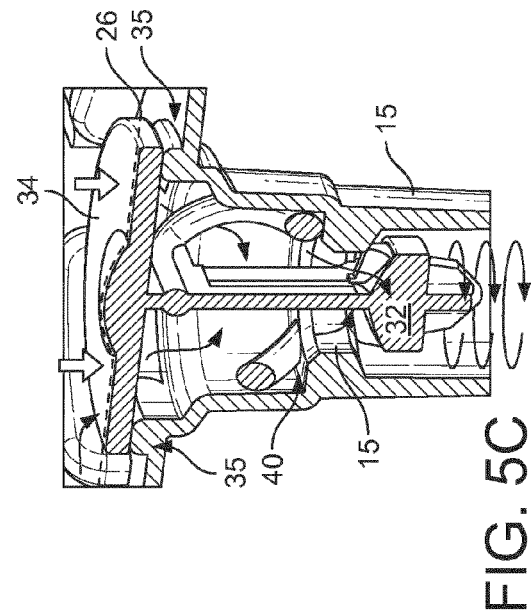
FIGS. 5A, 5B, 5C are views of a third embodiment of a foaming whisk, similar to respectively FIGS. 4A, 4B and 4C.
Figure 5B:
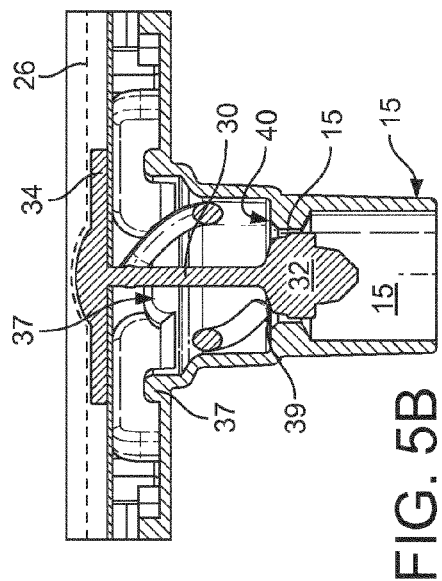
Figure 5A:
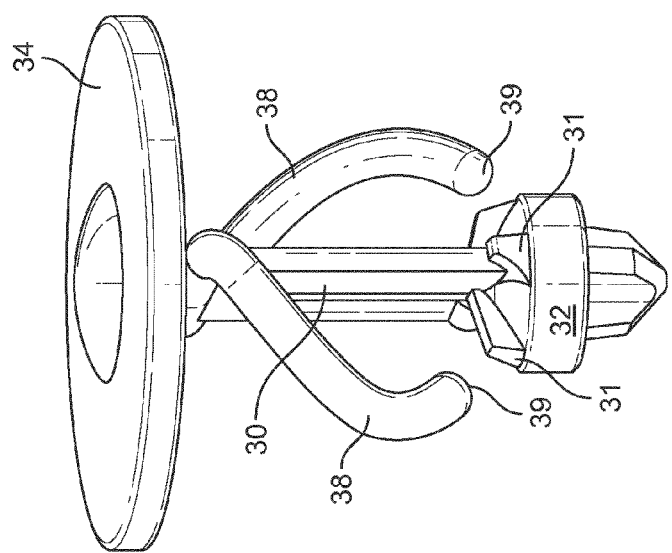

In a third embodiment of the invention illustrated in FIGS. 5A, 5B, and 5C, the foaming whisk 29 is very similar to that of the second embodiment described above. However, in this case, the plug 32 has a shape and dimensions adapted to close the dispensing channel 15 when said plug is located within said channel as shown in FIG. 5B. The whisk further comprises two elastically deformable curved springs 38 that extend downwardly from the upper part of the whisk rod 30 as shown in FIG. 5C.

The springs 38 have the shape of helical arms and their length and section are such that they are able to resiliently flex when compressed, without breaking, such as to link said whisk to the capsule in a movable manner between two alternative positions, as follows.

Firstly, a closed position where fluid pressure within the container cavity is below a first predetermined pressure $P_c$, the whisk spring is at rest in its extended configuration and the tips 39 of each spring arm 38 rests onto a resting edge 40 of the channel 15, and the whisk plug seals against a sealing portion of the channel walls, as illustrated in FIG. 5B.

And secondly, a dispensing position where pressure within the container cavity 27 is equal or superior to $P_c$, the fluid within said cavity exerts a pressure (illustrated with double arrows in FIG. 5C) on the pierceable wall 26 and the plate-shaped top 34, such that the whisk is moved downwards and the springs 38 are elastically deformed in compression. In that configuration, the whisk plug 32 is moved away from the channel walls so that said flowable food or beverage can flow outside of said container through said channel, as illustrated with arrows in FIG. 5C. Furthermore, in that position, the vertical movement of the whisk is stopped when the plate-shaped top 34 rests onto the crenelated edge 35 as shown in FIG. 5C.

Figure 6B:
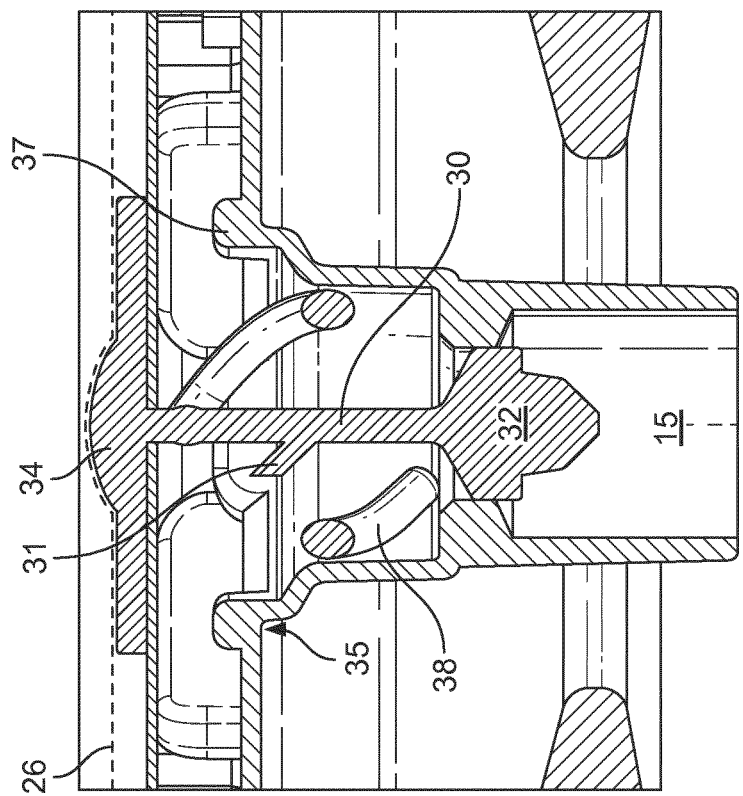
FIGS. 6A, 6B, are views of a fourth embodiment of a foaming whisk, similar to respectively FIGS. 4A and 4B.
Figure 6A:
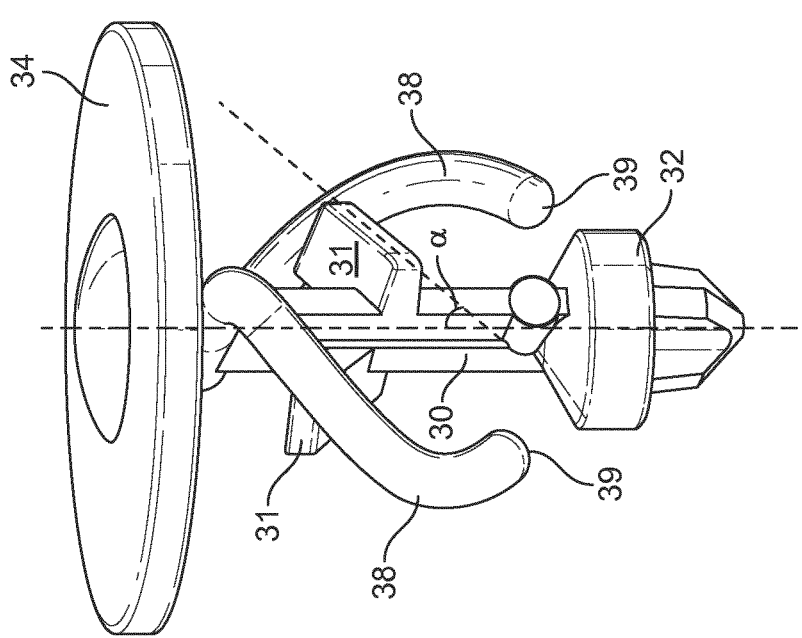

In a fourth embodiment of the invention shown in FIGS. 6A and 6B, the foaming whisk 29 comprises a pair of spring arms 38 as described above and having the same function of releasably closing the dispensing channel 15 as shown in FIG. 6B, when no pressure of little pressure (inferior to an opening pressure PC) is present within the capsule cavity. In this case, the foaming blades 31 are single curvature blades that extend generally horizontally from the whisk rod 30, each blade plane being oriented at an angle $\alpha$ relative to the vertical longitudinal axis of the whisk which is comprised between 10° and 80°, preferably an angle $\alpha$ comprised between 25° and 65° as shown in FIG. 6A.

Figure 7B:
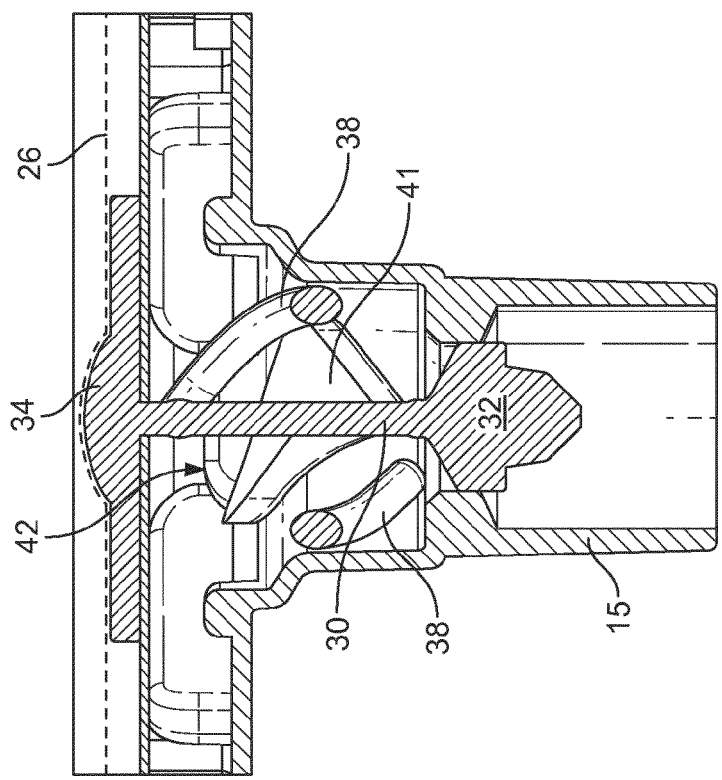
FIGS. 7A, 7B, are views of a fifth embodiment of a foaming whisk, similar to respectively FIGS. 3A and 3B.
Figure 7A:
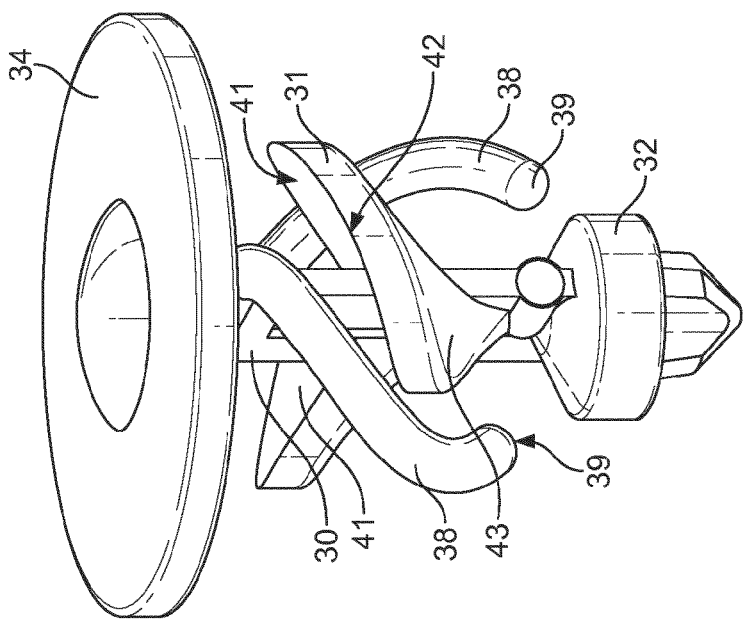

In a fifth embodiment of the invention, illustrated in FIGS. 7A and 7B, the whisk 29 has a shape that is identical to that of the first embodiment described above with reference to FIGS. 3A to 3C. However, this particular fifth embodiment differs from the first one in that the whisk further comprises a pair of spring arms 38 as described above in relation to third and fourth embodiments. Again, the functioning is the same as described in the third and fourth embodiments, and in the rest position, the plug 32 of the foaming whisk 29 closes the dispensing channel 15 of the capsule C, as shown in FIG. 7B.

Importantly, when the blades of the whisk have a complex curvature, for instance a double curvature as described above with reference to the first and fifth embodiments, the front face 41 of each blade, as well as its leading edge 42, are turned upwardly towards the inside of the capsule, while the back 43 of each blade is turned towards the exit of the dispensing channel, as shown for instance in FIG. 7A. This orientation is the proper one to direct the flow of liquid, and impel a turning movement to the liquid flow. Again, the general plane of the blades is tilted relative to the vertical longitudinal axis of the whisk and channel, with an angle $\alpha$ that is comprised between 10° and 80°, preferably an angle $\alpha$ comprised between 25° and 65°.

Furthermore, in all of the previous embodiments described above, the whisk 29 can be stationary, or it can be movable in rotation during the passage of fluid through the dispensing channel 15.

In case it is stationary, it can be assembled to the rest of the capsule as a separate element as described above, or alternatively, it can be injection moulded as an integral part of the capsule.

In case it is movable in rotation around its longitudinal (vertical) axis, its rotation movement is preferably actuated by the passage of liquid onto the surface of the blades (passive actuation), but it can also be envisaged to actuate the rotation with a actuating element such as an engine, or magnetically (active actuation). Whatever the actuation, the rotation of the whisk is a factor to further enhance the cyclonic speed and shearing of the product that exits the dispensing channel, hence enhancing the foaming capabilities of the capsule.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A container for the preparation of flowable food or beverage compositions and adapted to be functionally inserted in a food or beverage preparation machine, the container comprising:
   walls defining at least one cavity for containing at least one precursor ingredient;
   a dispensing channel through which the flowable food or beverage compositions can flow to a consumer receptacle; and
   a foaming whisk element comprising a longitudinal rod and at least one blade, located at least partially into the dispensing channel to whip a product when the product exits the dispensing channel, the foaming whisk element comprises at least one elastically deformable curved spring that extends downwardly from an upper part of the longitudinal rod.

2. The container according to claim 1, wherein the foaming whisk element is an elongated element having a longitudinal axis that can rotate about the longitudinal axis.

3. The container according to claim 2, wherein the rotation of the foaming whisk element is actuated by a flow of the product dispensed through the dispensing channel.

4. The container according to claim 1, wherein the at least one blade is a double curvature blade.

5. A container for the preparation of flowable food or beverage compositions and adapted to be functionally inserted in a food or beverage preparation machine, the container comprising:
   walls defining at least one cavity for containing at least one precursor ingredient;
   a dispensing channel through which the flowable food or beverage compositions can flow to a consumer receptacle; and
   a foaming whisk element comprising a longitudinal rod and at least one blade, located at least partially into the dispensing channel to whip a product when the product exits the dispensing channel, wherein the foaming whisk element comprises a plug having shapes and dimensions adapted to close the dispensing channel when the plug is located within the dispensing channel, the foaming whisk element further comprising at least one elastically deformable curved spring able to link the foaming whisk element to the container in a movable manner between:
   a closed position where pressure within the container cavity is below a first predetermined pressure, the at least one elastically deformable curved spring is at rest, and the plug seals against a sealing portion of walls of the channel, and
   a dispensing position where pressure within the container cavity is equal or superior to the first predetermined pressure, the whisk spring is elastically deformed, and the whisk plug is moved away from the walls of the channel so that the flowable food or beverage compositions can flow outside of the container through the dispensing channel.

6. The container according to claim 1, which is a rigid or semi-rigid capsule.

7. The container according to claim 1, which is for the preparation of a beverage selected from the group consisting of coffee, tea, chocolate, and fruit based beverage.

8. A container for the preparation of flowable food or beverage compositions and adapted to be functionally inserted in a food or beverage preparation machine, the container comprising:
   walls defining at least one cavity for containing at least one precursor ingredient;
   a dispensing channel through which the flowable food or beverage compositions can flow to a consumer receptacle; and
   a foaming whisk element comprising a longitudinal rod and at least one blade, located at least partially into the dispensing channel to whip a product when the product exits the dispensing channel, wherein the foaming whisk element comprises a plug at a lowermost distal end of the longitudinal rod, and the plug is configured to deviate a flow of liquid flowing through the dispensing channel and create a tube-like flow by pressing the liquid in a space between an internal surface of the dispensing channel and an external surface of the plug.

* * * * *